United States Patent
Song et al.

(10) Patent No.: US 11,050,922 B2
(45) Date of Patent: Jun. 29, 2021

(54) AUTOMATIC FOCUSING METHOD AND APPARATUS BASED ON REGION OF INTEREST

(71) Applicants: Suzhou Keda Technology Co., Ltd., Jiangsu (CN); Suzhou Keyuan Software Technology Co., Ltd., Jiangsu (CN); Suzhou Keda Special Video Co., Ltd., Jiangsu (CN)

(72) Inventors: Jiayang Song, Jiangsu (CN); Fengfeng Tang, Jiangsu (CN); Yong Zhang, Jiangsu (CN); Lijun Cao, Jiangsu (CN); Weidong Chen, Jiangsu (CN)

(73) Assignees: Suzhou Keda Technology Co., Ltd., Jiangsu (CN); Suzhou Keyuan Software Technology Co., Ltd., Jiangsu (CN); Suzhou Keda Special Video Co., Ltd., Jiangsu (CN)

( * ) Notice: Subject to any disclaimer, the term of this patent is extended or adjusted under 35 U.S.C. 154(b) by 6 days.

(21) Appl. No.: 16/546,889

(22) Filed: Aug. 21, 2019

(65) Prior Publication Data

US 2020/0021747 A1    Jan. 16, 2020

Related U.S. Application Data (63) Continuation of application No. PCT/CN2017/117163, filed on Dec. 19, 2017.

(30) Foreign Application Priority Data

Feb. 21, 2017   (CN) .................... 201710094614.4

(51) Int. Cl.
    *H04N 5/232* (2006.01)
    *G06T 7/70* (2017.01)
    *G06T 7/60* (2017.01)

(52) U.S. Cl.
    CPC ......... *H04N 5/232127* (2018.08); *G06T 7/60* (2013.01); *G06T 7/70* (2017.01); *G06T 2207/20021* (2013.01)

(58) Field of Classification Search
    CPC .......... H04N 5/232127; H04N 5/23212; G06T 7/70; G06T 7/60; G06T 2207/20021; G03B 13/36; G02B 7/28
    See application file for complete search history.

(56) References Cited

U.S. PATENT DOCUMENTS

2006/0078217 A1    4/2006  Poon et al.
2012/0262563 A1*  10/2012  Marcelpoil ............... G06T 7/33
                                                348/79

(Continued)

FOREIGN PATENT DOCUMENTS

CN        101079948 A      11/2007
CN        101840055 A       9/2010

(Continued)

OTHER PUBLICATIONS

Office Action of corresponding application EP 17 897 500.9; dated Jan. 7, 2020; 8 pages.

(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

An automatic focusing method and apparatus comprise the following steps: acquiring a target image that has been divided into blocks; acquiring the definition of each block, respectively; acquiring normalized central coordinates and a normalized size of a region of interest on the target image; respectively calculating a full width at half maximum coefficient in the horizontal direction and the vertical direction (Continued)

according to the normalized size; calculating a weight value of each block using a two-dimensional discrete Gaussian function according to the normalized central coordinates and the full width at half maximum coefficient; calculating a normalized overall definition of the target image according to the weight value and definition of each block; and focusing according to the normalized overall definition. The method and apparatus can automatically calculate a mask of the region of interest, thereby avoiding the occupying of storage space required when storing ROI mask data.

13 Claims, 5 Drawing Sheets (56) References Cited

U.S. PATENT DOCUMENTS

| | | | | |
|---|---|---|---|---|
| 2012/0314960 | A1* | 12/2012 | Tay | G02B 7/36 |
| | | | | 382/199 |
| 2013/0176457 | A1 | 7/2013 | Yasuhiro | |
| 2014/0192221 | A1 | 7/2014 | Rao et al. | |
| 2015/0227022 | A1 | 8/2015 | Fluckiger | |
| 2016/0180196 | A1* | 6/2016 | Taylor | G06K 9/6215 |
| | | | | 382/103 |
| 2016/0323525 | A1* | 11/2016 | Lee | G06T 5/40 |

FOREIGN PATENT DOCUMENTS

| | | |
|---|---|---|
| CN | 101943839 A | 1/2011 |
| CN | 102169275 A | 8/2011 |
| CN | 102542545 A | 7/2012 |
| CN | 102968784 A | 3/2013 |
| CN | 103424953 A | 12/2013 |
| CN | 103702032 A | 4/2014 |
| CN | 105472250 A | 4/2016 |
| CN | 106973219 A | 7/2017 |

OTHER PUBLICATIONS

Office Action from corresponding European application EP 17897500.9; dated Aug. 31, 2020; 4 pages.
Extended European Search Report of corresponding application EP 17897500.9; dated Dec. 5, 2019; 4 pages.
International Search Report and Written Opinion of corresponding application PCT/CN2017/117163; dated Mar. 15, 2018; 8 pages.
First Chinese Office Action of corresponding application CN 201280057294.0; dated Mar. 1, 2019; 7 pages.
Song et al., Dictionary Learning with Segmentation for Compressed-Sensing Magnetic Resonance Imaging, Chinese Journal of Magnetic Resonance; vol. 33, No. 4; Dec. 2016; with English Abstract; 11 pages.
Office Action from corresponding European application EP 17897500.9; dated Jan. 12, 2021; 4 pages.

* cited by examiner

AUTOMATIC FOCUSING METHOD AND APPARATUS BASED ON REGION OF INTEREST

CROSS REFERENCE TO RELATED APPLICATIONS

This application is a continuation of International Application No. PCT/CN2017/117163, filed on Dec. 19, 2017, which is based upon and claims priority to Chinese Patent Application No. 201710094614.4, filed on Feb. 21, 2017, the entire contents of which are incorporated herein by reference.

TECHNICAL FIELD

The present invention relates to the field of imaging technology, particularly to an automatic focusing method and apparatus based on a region of interest.

BACKGROUND

Figure 1:
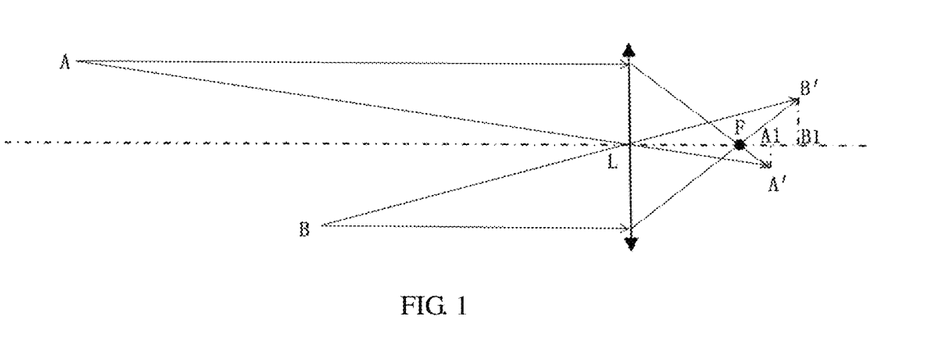
FIG. 1 is a diagram illustrating imaging and focusing principles.

These days, there are various commercially available electronic devices or systems with camera functions, such as video surveillance system, handheld camera and mobile phones that can shoot videos, etc. These devices can obtain images in real time and display them on a display apparatus. It is necessary to focus the image when taking images or videos, mainly in two patterns currently: automatic focusing and manual focusing. As to a device with an automatic focusing function, a focusing motor can be driven to adjust a focusing lens, so that a target object of interest is clearly focused on a camera image sensor, and each clear point of the target object is imaged as a point on the sensor (sensor) (strictly a spot that is sufficiently small enough to be a point). Target objects at different distances correspond to focus lenses at different positions. With the lens having a small depth of field (i.e. a long focal length and a large aperture), only one target at a certain distance can be chosen to be rendered clearly while target objects at other distances vaguely, when target objects at different and widely-varying distances appear on the same image. As shown in FIG. 1, points A and B are two target objects at different distances from a lens L (point L is the optical centre of the lens) and at different positions, line LF is an axis through the lens centre, A is above the optic axis and B below the optic axis, F is the focal point of the lens. Under imaging principles, the point A and point B are respectively imaged as A' and B', A1 and B1 are respectively projection points of A' and B' on the optic axis. If A1 and A' are on a plane of the image sensor, then the image A' of point A is focused clearly, while the image B' of point B is focused vaguely; and if B1 and B' are on the plane of the image sensor, then the image of point B is focused clearly, while the image A' of point A is focused vaguely.

A region of interest (ROI, region of interesting) refers to a part of an acquired image in which a user has the greatest interest. In the prior art, a region can be set by the user, and an image mask within the region serves as a region of interest, so that the image within the region is focused clearly and exposed properly during the focusing, thus obtaining a high quality image. But this method needs to stores a mask of the region of interest in advance, taking up storage space.

SUMMARY

Therefore, the technical problem to be solved by the present invention is that existing focusing methods based on a region of interest requires storing a mask in advance, which takes up storage space.

To this end, embodiments of the present invention provide the following technical solutions:

an embodiment of the present invention provides an automatic focusing method based on a region of interest, including the following step: acquiring a target image that has been divided into blocks; acquiring the definition of each block, respectively; acquiring normalized central coordinates and a normalized size of a region of interest on the target image; respectively calculating a full width at half maximum coefficient in the horizontal direction and the vertical direction according to the normalized size; calculating a weight value of each block using a two-dimensional discrete Gaussian function according to the normalized central coordinates and the full width at half maximum coefficient; calculating a normalized overall definition of the target image according to the weight value and definition of each block; and focusing according to the normalized overall definition.

Optionally, the step of respectively calculating a full width at half maximum coefficient in the horizontal direction and the vertical direction according to the normalized size includes: calculating the full width at half maximum coefficient in the horizontal direction according to the number of the blocks in the horizontal direction and the width of the normalized size; and calculating the full width at half maximum coefficient in the vertical direction according to the number of the blocks in the vertical direction and the height of the normalized size.

Optionally, the step of calculating a weight value of each of the blocks according to the normalized central coordinates and the full width at half maximum coefficient respectively includes a process of calculating central coordinates corresponding to distribution of the blocks according to the normalized central coordinates, including: calculating a horizontal coordinate of the central coordinates according to the number of the blocks in the horizontal direction and the horizontal coordinate of the normalized central coordinates; and calculating a vertical coordinate of the central coordinates according to the number of the blocks in the vertical direction and the vertical coordinate of the normalized central coordinates.

Optionally, the weight value of the blocks is calculated via the following function:

$$g_{i,j} = c1 * \exp\left(-\left(\frac{(i-\mu_h)^2}{2\sigma_h^2} + \frac{(j-\mu_v)^2}{2\sigma_v^2}\right)\right)$$

wherein, i and j respectively represent the subscript of a row and the subscript of a column where the block is located, which are integers greater than or equal to 0, $g_{i,j}$ represents a weight value of the block, c1 is a constant greater than 0, representing a maximum weight value, $\mu_h, \mu_v$ respectively represent the horizontal coordinate and the vertical coordinate of the central coordinates, $\sigma_h$ and $\sigma_v$ respectively represent the full width at half maximum coefficient in the horizontal direction and the vertical direction.

Optionally, the step of calculating a normalized overall definition of the target image according to the weight value and definition of each block includes: weighting the definition of each of the blocks respectively according to a corresponding weight value; summing up the definition of each of the blocks after the weighting of the definition of the blocks, so as to obtain the overall definition; summing up the weight value of each of the blocks; and dividing the overall definition by the sum of the weight value, so as to obtain the normalized overall definition.

Optionally, the step of calculating a normalized overall definition of the target image according to the weight value and definition of each block includes: calculating the sum of the weight value of each of the blocks; dividing the weight value of each of the blocks by the sum of the weight value, respectively, so as to obtain a corresponding normalized weight value; calculating a normalized definition of a corresponding block respectively using the normalized weight value; and summing up the normalized definition of each of the blocks, so as to obtain the normalized overall definition.

An embodiment of the present invention also provides an automatic focusing apparatus based on a region of interest, including: a first acquisition unit, for acquiring a target image that has been divided into blocks; a second acquisition unit, for acquiring the definition of each block, respectively; a third acquisition unit, for acquiring normalized central coordinates and a normalized size of a region of interest on the target image; a full width at half maximum coefficient calculation unit, for respectively calculating a full width at half maximum coefficient in the horizontal direction and the vertical direction according to the normalized size; a weight value calculation unit, for calculating a weight value of each block using a two-dimensional discrete Gaussian function according to the normalized central coordinates and the full width at half maximum coefficient; a normalized overall definition calculation unit, for calculating a normalized overall definition of the target image according to the weight value and definition of each block; and a focusing unit, for focusing according to the normalized overall definition.

Optionally, the full width at half maximum coefficient calculation unit includes: a first full width at half maximum coefficient calculation subunit, for calculating the full width at half maximum coefficient in the horizontal direction according to the number of the blocks in the horizontal direction and the width of the normalized size; and a second full width at half maximum coefficient calculation subunit, for calculating the full width at half maximum coefficient in the vertical direction according to the number of the blocks in the vertical direction and the height of the normalized size.

Optionally, the weight value calculation unit includes: a first central coordinate calculation subunit, for calculating a horizontal coordinate of the central coordinates according to the number of the blocks in the horizontal direction and the horizontal coordinate of the normalized central coordinates; and a second central coordinate calculation subunit, for calculating a vertical coordinate of the central coordinates according to the number of the blocks in the vertical direction and the vertical coordinate of the normalized central coordinates.

Optionally, the normalized overall definition calculation unit includes: a first weighting calculation subunit, for weighting the definition of each of the blocks respectively according to a corresponding weight value; an overall definition calculation subunit, for summing up the definition of each of the blocks after the weighting of the definition of the blocks, so as to obtain the overall definition; a first summation subunit, for summing up the weight value of each of the blocks; and a normalization subunit, for dividing the overall definition by the sum of the weight value, so as to obtain the normalized overall definition.

Optionally, the normalized overall definition calculation unit includes: a second summation subunit, for calculating the sum of the weight value of each of the blocks; a normalized weight value calculation subunit, for dividing the weight value of each of the blocks by the sum of the weight value, respectively, so as to obtain a corresponding normalized weight value; a second weighting calculation subunit, for calculating a normalized definition of a corresponding block respectively using the normalized weight value; and a third summation subunit, for summing up the normalized definition of each of the blocks, so as to obtain the normalized overall definition.

The technical solutions of the present invention have the following advantages:

in the automatic focusing method based on a region of interest provided by the embodiments of the present invention, storage of a ROI mask data taking up storage space is avoided, through selection of a rectangular region by a user on a target image, i.e., a region of interest, followed by automatic generation of a ROI mask for focusing via Gaussian function with several simple parameters of the region of interest. In addition, the generated mask can perform focusing using a target object on the periphery when there is no target object at a ROI centre set by the user.

BRIEF DESCRIPTION OF THE DRAWINGS

In order to make a clearer description of technical solutions in specific implementations of the present invention or prior art, drawings involved in description for the specific implementations or the prior art will be briefly introduced, and apparently, the drawings described below illustrate some implementations of the present invention, for one with ordinary skill in the art, other drawings can also be obtained in accordance with these drawings without delivering creative efforts.

DETAILED DESCRIPTION

Technical solutions of the present invention will be described clearly and completely as follows in conjunction with the drawings, apparently, the described embodiments are just part rather than all embodiments of the present invention. Based on the embodiments in the present invention, all other embodiments obtained by one with ordinary skill in the art without delivering creative efforts shall fall into the protection scope of the present invention.

In addition, the technical features related in different implementations of the present invention as described below can be combined with each other as long as no contradiction occurs therebetween.

Embodiment 1

Figure 2:
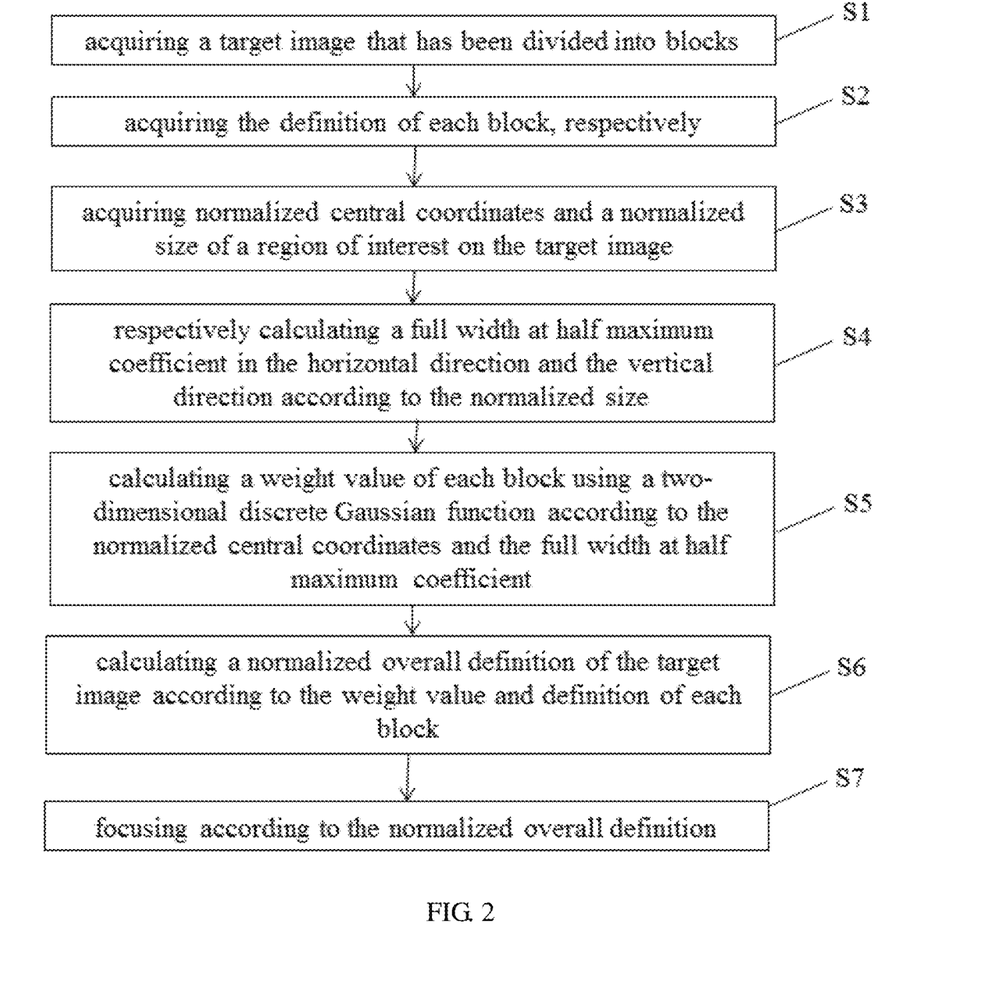
FIG. 2 is a flowchart for an automatic focusing method in embodiment 1 of the present invention.

An automatic focusing method based on a region of interest is provided in this embodiment, which can be used for a camera device or system with an automatic focusing function, such as video monitoring systems, hand-held cameras, and mobile phones capable of shooting videos, etc. As shown in FIG. 2, the method includes the following steps:

S1: acquiring a target image that has been divided into blocks;

S2: acquiring the definition of each block, respectively;

S3: acquiring normalized central coordinates and a normalized size of a region of interest on the target image;

S4: respectively calculating a full width at half maximum coefficient in the horizontal direction and the vertical direction according to the normalized size;

S5: calculating a weight value of each block using a two-dimensional discrete Gaussian function according to the normalized central coordinates and the full width at half maximum coefficient;

S6: calculating a normalized overall definition of the target image according to the weight value and definition of each block; and S7: focusing according to the normalized overall definition.

The acquired target image can firstly be filtered by a filter, prior to being divided into blocks of equal size in N rows and M columns (M and N are positive integers greater than 1 and are also constant during one automatic focusing process), and the definition evaluation parameters $fv_{i,j}$ ($i \in [0,N-1], j \in [0,M-1]$) of each block are respectively calculated, so as to obtain a matrix of N×M sub-definition evaluation parameters. During the automatic focusing, the above-mentioned sub-definition evaluation parameters $fv_{i,j}$ are respectively weighted before being summed up, resulting in an overall definition evaluation parameter of this image, which is followed by automatic focusing according to the overall definition evaluation parameter. When there are plural target objects with different distances in the target image, it is necessary to focus the region of interest set by the user according to his requirement, since the limitation in the depth of field of the camera will lead to various sharp-focused results. And in order to focus a region of interest set by the user, the block where the region of interest is located needs to be endowed with a greater weight value during calculation of the overall definition evaluation parameter, while other blocks are endowed with smaller weight values. Through this method, the calculated overall definition evaluation parameter, when undergoing automatic focusing, has a great chance to be focused on a target object in the region of interest, resulting in clear imaging of the target object.

Figure 3:
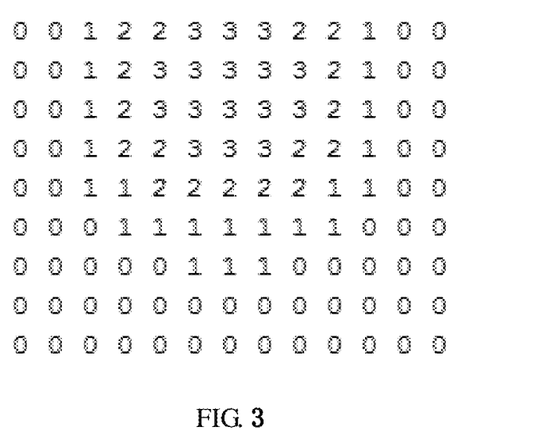
FIG. 3 is an image matrix diagram for a mask of a region of interest.
Figure 4:
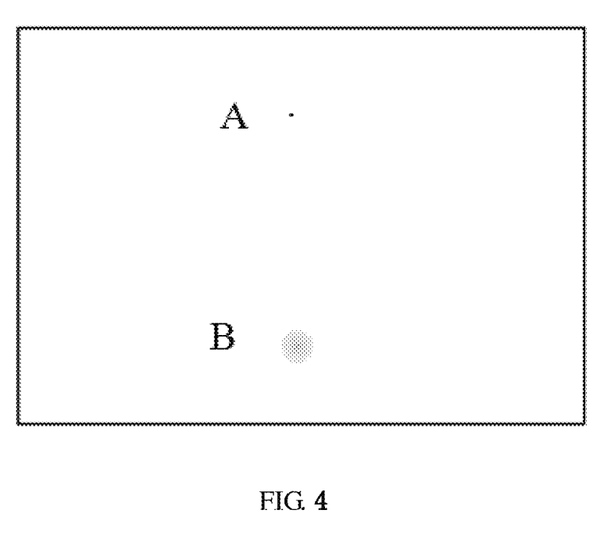
FIG. 4 shows a diagram for imaging definition after imaging of the image shown in FIG. 3.
Figure 5:
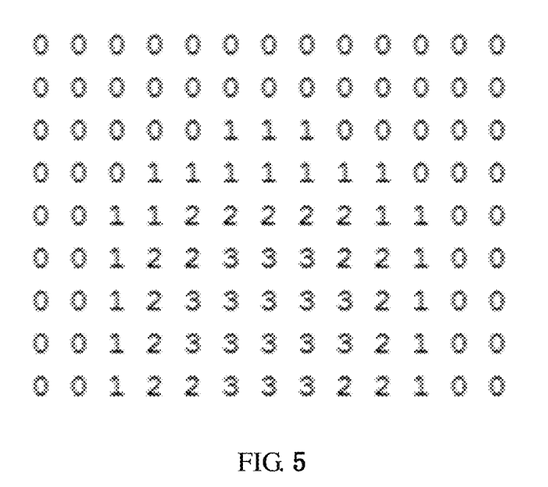
FIG. 5 is an image matrix diagram for another kind of mask for a region of interest.
Figure 6:
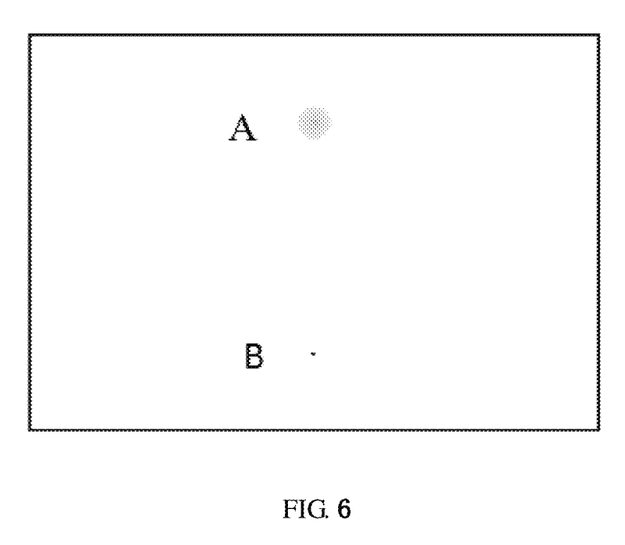
FIG. 6 is a diagram for imaging definition of the image shown in FIG. 5.

For example, as shown in FIG. 3-FIG. 6, a target object A and a target object B (which, with a certain size and texture, are respectively abstracted as a point, to deliver a simple model) are respectively located at an upper and a lower position in the middle of the image, dividing the image into 13×9 blocks, (herein 13×9 is merely an example to illustrate a ROI weight table, and can actually be any number, and M are N positive integers). As shown in FIG. 3, if the blocks near the target object A are endowed with a maximum weight value of 3, and other blocks, including the ones near the target object B are endowed with a smaller weight value, as shown in FIG. 4, then the target object A is focused as a clear point, and the target object B is diffused through imaging. As shown in FIG. 5, if the blocks in the vicinity of the target object B are endowed with a maximum weight value of 3, while other blocks, including those near the target object A, are endowed with a smaller weight value, as shown in FIG. 6, then the target object B is focused as a clear point, and the target object A is diffused through imaging.

This embodiment provides an automatic focusing method based on a region of interest, storage of a ROI mask data taking up storage space is avoided, through selection of a rectangular region by a user on a target image, i.e., a region of interest, followed by automatic generation of a ROI mask for focusing via Gaussian function with several simple parameters of the region of interest. In addition, if texture information in the region of interest is sufficient enough (i.e., the definition evaluation parameters are remarkably different between a well-focused image and a poor-focused image), at this point the weighted definition evaluation parameters in the region of interest make a great contribution to the overall definition evaluation parameter of the target image, which, when being used to conduct automatic focusing, renders a clear image in the region of interest. If texture information in the region of interest is sufficient enough (i.e., the definition evaluation parameters are unremarkably different between a well-focused image and a poor-focused image), then the region with a smaller weight value has sufficient texture information, and the definition evaluation parameter of a low weight region makes great contribution to the overall definition evaluation parameter after the weighting; when the overall definition evaluation parameter is used for automatic focusing, the focus falls on a target with rich textures in the low weight region, and the focusing is correct, although it is a clear image in the low weight region.

Specifically, the above step S4, namely, the step of respectively calculating a full width at half maximum coefficient in the horizontal direction and the vertical direction according to the normalized size includes:

calculating the full width at half maximum coefficient in the horizontal direction according to the number of the blocks in the horizontal direction and the width of the normalized size. Specifically, the calculation is performed according to the following formula: $\sigma_h = C_3 * M * m'$, $\sigma_h$ is the full width at half maximum coefficient in the horizontal direction, $C_3$ is a constant with a value of 0.5, 1, 1.5, etc., M is the number of the blocks in the horizontal direction (i.e., the column number), and m' is the width of the normalized size; and calculating the full width at half maximum coefficient in the vertical direction according to the number of the blocks in the vertical direction and the height of the normalized size, specifically, the calculation is performed according to the following formula: $\sigma_v = C_4 * N * n'$, $\sigma_v$ is the full width at half maximum coefficient in the vertical direction, $C_4$ is a constant with a value of 0.5, 1, 1.5, etc., which can be the same value as $C_3$, N is the number of the blocks in the vertical direction (i.e., the row number), and n' is the height of the normalized size.

To be noted, in the embodiments of the present invention, the region of interest can be rectangular or of other closed geometrical shapes, for example, circles, diamonds, etc. For other closed geometries of a non-rectangular shape, during the calculation, it is equivalent to the circumscribed rectangle of the geometry, the width and height of which correspond to those of the circumscribed rectangle.

In a specific implementation, the above step S5, i.e., the step of calculating a weight value of each block according to the normalized central coordinates and the full width at half maximum coefficient respectively includes a process of calculating central coordinates corresponding to distribution of the blocks according to the normalized central coordinates, including:

firstly, calculating a horizontal coordinate of the central coordinates according to the number of the blocks in the horizontal direction and the horizontal coordinate of the normalized central coordinates, specifically according to the following formula:

$\mu_h = (M-1) \mu'_h$, $\mu_h$ is the horizontal coordinate of the central coordinates (which is rounded into a nearest integer), M is the number of the blocks in the horizontal direction (i.e., the column number), and $\mu'_h$ is the horizontal coordinate of the normalized central coordinates; and then calculating a vertical coordinate of the central coordinates according to the number of the blocks in the vertical direction and the vertical coordinate of the normalized central coordinates, specifically according to the following formula: $\mu_v = (N-1)*\mu_v'$, $\mu_v$ is the vertical coordinate of the central coordinates (which is rounded into a nearest integer), N is the number of the blocks in the vertical direction (i.e., the row number), and $\mu_v'$ is the vertical coordinate of the normalized central coordinates.

In this embodiment, because the mask of the region of interest to be generated corresponds to the blocks divided from the target image, rather than to the size of the image itself, it is the normalized central coordinates ($\mu'_h$, $\mu_v'$) and normalized window size m'×n' of the region of interest that the user needs to acquire after selecting a focus region (a region of interest) with a box on the interface, the normalized image has a size of 1×1, i.e., the image has a coordinate of (0, 0) on the top-left corner, and a coordinate of (1,1) on the bottom-right corner, then $0<\mu'_h<1$, $0<\mu_v'<1$, $C_2<m'<1$, $C_2<n'<1$. $C_2$ is a preset minimum size of the region of interest size, a constant, aimed at avoiding a region of interest selected by a user that is too small to be automatically focused in some cases, and m'=$C_2$, n'=$C_2$ if the width of the region of interest selected by the user, i.e., m'<$C_2$ or n'<$C_2$.

Specifically, after the step of respectively calculating the full width at half maximum coefficient in the horizontal direction and in the vertical direction as well as the central coordinates of the region of interest according to the above method, in the above step S5, the weight value of each block may be calculated via the following function:

$$g_{i,j} = c1 * \exp\left(-\left(\frac{(i-\mu_h)^2}{2\sigma_h^2} + \frac{(j-\mu_v)^2}{2\sigma_v^2}\right)\right) \quad (1)$$

wherein, i and j respectively represent the row subscript and the column subscript where the block is located, which are integers greater than or equal to 0, if the target function is divided into M×N blocks (M is the column number, N is the row number), then $i \in [0, N-1]$, $j \in [0, M-1]$; $g_{i,j}$ represents the weight value of the block; c1 is a constant greater than 0, representing the maximum weight value, which may be any constant greater than 0, and is usually an integer greater than 1 in this embodiment so that $g_{i,j}$ is an integer; $\mu_h$ and $\mu_v$ respectively represent the horizontal coordinate and the vertical coordinate of the central coordinates, $\sigma_h$ and $\sigma_v$ respectively represent the full width at half maximum coefficient in the horizontal direction and the vertical direction, which are constants greater than 0. After calculation of the weight value of each block respectively according to the above formula (1), they form an automatic focus matrix of the region of interest, i.e. the mask of the region of interest.

Figure 7:
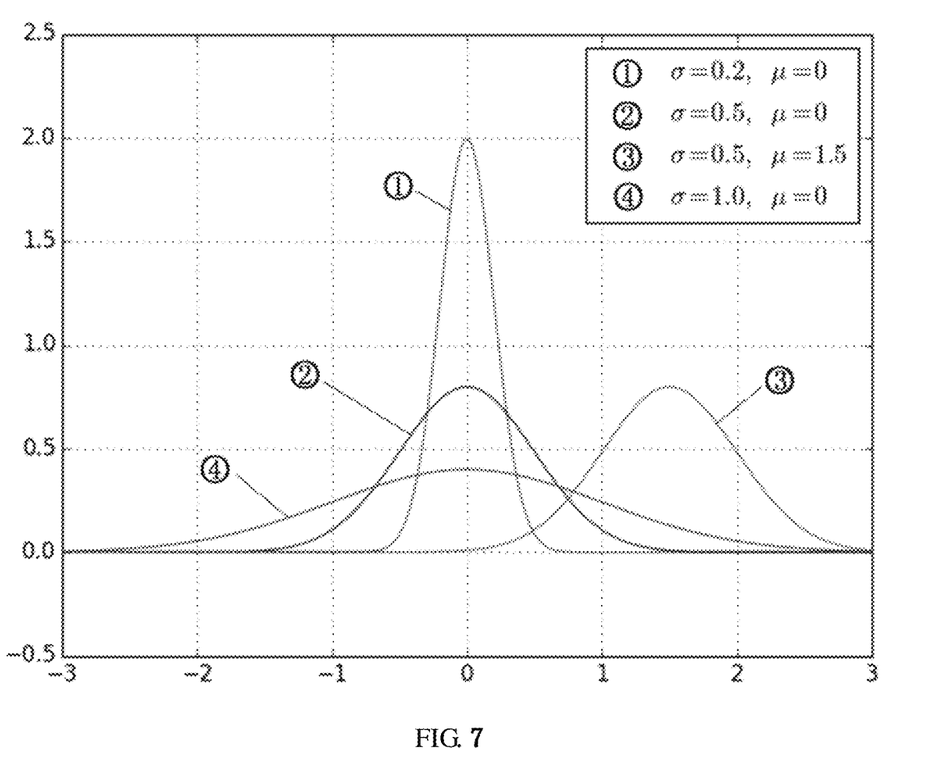
FIG. 7 is an oscillograph of Gaussian function when σ and μ have different values.

The above formula (1) is obtained through the following processes:

Firstly, normalizing a one-dimensional Gaussian function:

$$f(x) = a \exp\left\{-\frac{(x-\mu)^2}{2\sigma^2}\right\},$$

the integral within the (−inf, +inf) range (actually this range is a normalize width of the image, rather than the full space thereof) is equal to 1, then $$f(x) = \frac{1}{\sigma\sqrt{2\pi}} \exp\left\{-\frac{(x-\mu)^2}{2\sigma^2}\right\},$$

wherein a, $\mu$ and $\sigma$ are constants, and a>0, $\mu$ is the of central position of a peak, c is directly proportional to the full width at half maximum (FWHM, the width of the peak at half height thereof) of the peak, FWHM=$2\sqrt{2\ln 2}\sigma \approx 2.135\sigma$, therefore, varying $\sigma$ can adjust the full width at half maximum of the Gaussian function peak, herein $\sigma$ is referred to as a full width at half maximum coefficient. FIG. 7 shows the waveform of Gaussian function when $\sigma$ and $\mu$ take different values.

Then a normalized two-dimensional Gaussian function is:

$$f(x, y) = \frac{1}{2\pi\sigma_x\sigma_y} \exp\left(-\left(\frac{(x-\mu_h)^2}{2\sigma_h^2} + \frac{(y-\mu_v)^2}{2\sigma_v^2}\right)\right)$$

wherein, $\mu_h$, $\mu_v$, $\sigma_h$ and $\sigma_v$ are constants, ($\mu_h$, $\mu_v$) is the central position, $\sigma$ is directly proportional to the full width at half maximum of the peak.

Last, a two-dimensional discrete Gaussian function is:

$$g_{i,j} = c1 * \exp\left(-\left(\frac{(i-\mu_h)^2}{2\sigma_h^2} + \frac{(j-\mu_v)^2}{2\sigma_v^2}\right)\right),$$

wherein, i and j are respectively subscripts of each discrete unit, representing a unit in the $i^{th}$ row and $j^{th}$ column, and are integers greater than or equal to 0; $\sigma_h$ and $\sigma_v$ are respectively standard deviations in the horizontal direction and the vertical direction, which are constants greater than 0. c1, which may be any constant greater than 0, is the maximum weight value, and is usually an integer greater than 1 in this embodiment.

After calculating the weight value $g_{i,j}$ of each block according to the above formula, the above step S6, i.e., the step of calculating a normalized overall definition of the target image according to the weight value and definition of each block includes:

Firstly, respectively weighting the definition of each of the blocks according to corresponding weight value, i.e., $g_{i,j} * fv_{i,j}$, $i \in [0, N-1]$, $j \in [0, M-1]$;

then, summing up the definition of each of the blocks after the weighting to obtain the overall definition, i.e. $\Sigma(g_{i,j} * f_{vi,j})$;

summing up the weight value of each of the blocks, i.e. $\Sigma g_{i,j}$; and eventually, dividing the overall definition by the sum of the weight values to obtain the normalized overall definition, i.e.

$$fv_{sum} = \frac{\sum (g_{i,j} * fv_{i,j})}{\sum g_{i,j}}.$$

In an alternative specific implementation, the above step S6, i.e., the step of calculating a normalized overall definition of the target image according to the weight value and definition of each block of step includes:

Firstly, summing up the weight value of each of the blocks, i.e. $\Sigma g_{i,j}$;

next, dividing the weight value of each of the blocks by the sum of the weight value, respectively, so as to obtain a corresponding normalized weight value, i.e.

$$g'_{i,j} = \frac{g_{i,j}}{\Sigma g_{i,j}};$$

then calculating a normalized definition of a corresponding block respectively using the normalized weight value, i.e. $g_{i,j}'*fv_{i,j}$; and eventually, summing up the normalized definition of each of the blocks, so as to obtain the normalized overall definition, i.e.

$$fv_{sum} = \Sigma(g_{i,j}'*fc_{i,j}).$$

Embodiment 2

This embodiment provides an automatic focusing method based on a region of interest, which can specifically be used in video surveillance systems, cameras and mobile phones that can shoot video, etc., and includes the following steps:

The first step: acquiring the normalized central coordinates $(\mu'_h, \mu'_v)$ and normalized size m'×n' of a rectangular region of interest a user selects on the target image, as well as the number of blocks M×N (width×height) divided from the target image. If m<$C_2$, then m'=$C_2$, if n'<$C_2$, then n'=$C_2$, $C_2$ is a preset minimum size of the region of interest. For example, the user selects the central position of a target image as a region of interest, then the normalized central coordinates are (0.5, 0.5), the target image is divided into 13×9 (M=13, N=9) blocks, wherein the values of m' and n' can be selected as required by the user, for example, with a window division of M=13, N=9, if m'=0.38, n'=0.44, then the ROI region selected by the user has 5×4 small windows.

The second step: calculating the horizontal and vertical coordinates of the central coordinates respectively according to the formula $\mu_h=(M-1)*\mu_h'$, $\mu_v=(N-1)*\mu v'$, and calculating the full width at half maximum coefficient in the horizontal direction and the vertical direction respectively according to the formula $\sigma_h=C_3*M*m'$, $\sigma_v=C_4*N*n'$.

Figure 8:
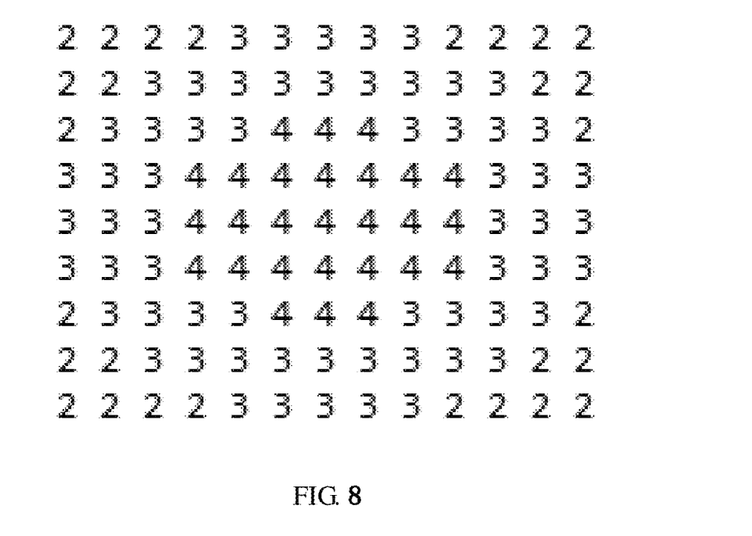
FIG. 8 is a matrix G composed of the weight value of each block in embodiment 2 of the present invention.
Figure 9:
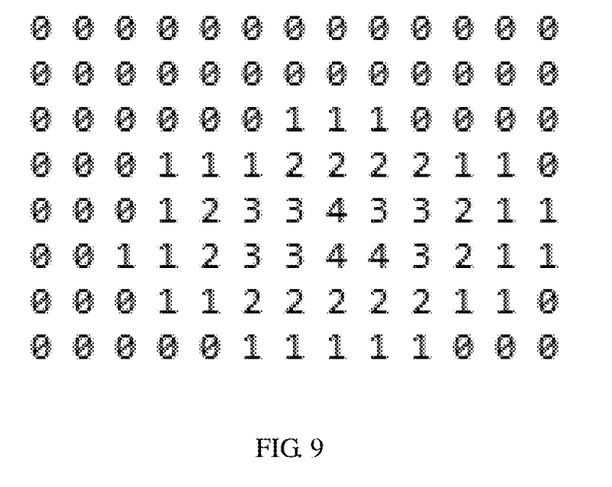
FIG. 9 is another matrix H composed of the weight value of each block in embodiment 2 of the present invention.

FIG. 8 and FIG. 9 are taken as two examples to make descriptions:

As shown in FIG. 8, when a central region is selected to be focused, the normalized central coordinates are (0.5, 0.5), and when M=13, N=9, c1=4, c2=0.2, c3=0.5, c4=0.5, m'=1, n'=1, $\mu'_h$=0.5, $\mu'_v$=0.5, performing calculation to obtain $\mu_h$=6, $\mu_v$=4, $\sigma_h$=6.5, $\sigma_v$=4.5, and the final sum of the weight is 350.

As shown in FIG. 9, when the user selects a region at the lower right position of the image to focus, and M=13, N=9, c1=4, c2=0.2, c3=0.5, c4=0.5, m'=0.4, n'=0.3, $\mu'_h$=0.6, $\mu'_v$=0.7, performing calculation to obtain $\mu_h$=7.2, $\mu_v$=5.6, $\sigma_h$=2.6, $\sigma_v$=1.35, and the final sum of the weight is 83.

The third step: after obtaining the full width at half maximum coefficient of the region of interest in the horizontal direction and the vertical direction as well as the coordinates of the central position respectively according to the above method, calculating the weight value of each block, i.e., obtaining a mask matrix G of the region of interest according to the following formula:

$$g_{i,j} = c1 * \exp\left(-\left(\frac{(i-\mu_h)^2}{2\sigma_h^2} + \frac{(j-\mu_v)^2}{2\sigma_v^2}\right)\right) \quad (1)$$

When c1=4, $\mu_h$=6, $\mu_v$=4, $\sigma_h$=5.5, $\sigma_v$=4.5, $g_{i,j}$ is rounded into a nearest integer, and the calculated matrix G is shown as FIG. 8.

The fourth step: after calculation using the formula $$fv_{sum} = \frac{\sum(g_{i,j}*fv_{i,j})}{\sum g_{i,j}} \text{ or } fv_{sum} = \sum\left(\frac{g_{i,j}}{\sum g_{i,j}}*fv_{i,j}\right)$$

to obtain the normalized overall definition, performing automatic focusing according to the normalized overall definition and other parameters.

Embodiment 3

Figure 10:
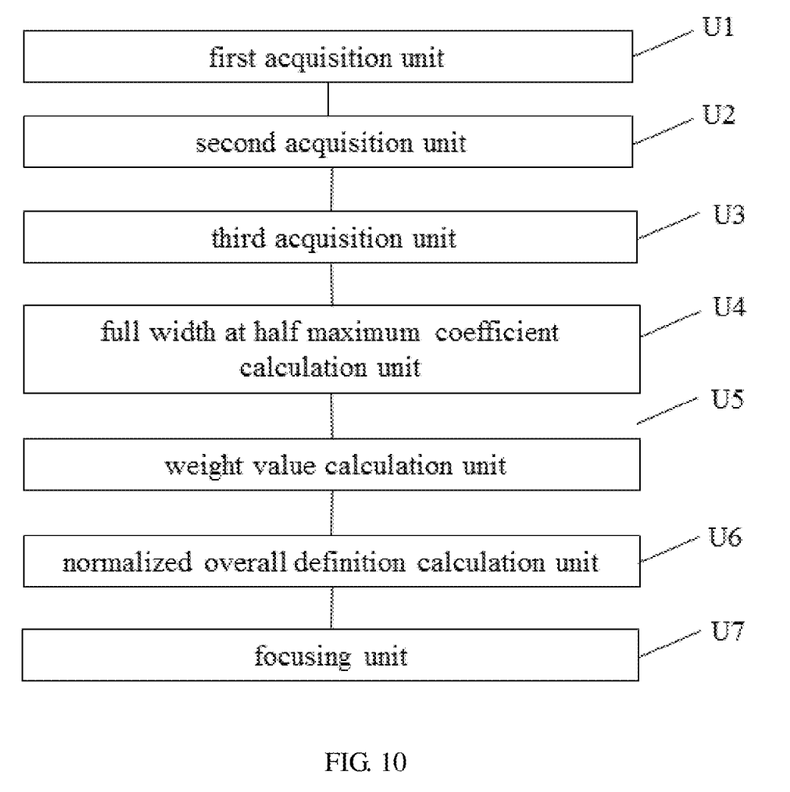
FIG. 10 is a block diagram illustrating the principle of an automatic focusing apparatus in embodiment 3 of the present invention.

As shown in FIG. 10, the embodiment provides an automatic focusing apparatus based on a region of interest, which is an implementation of a product corresponding to the method provided in the above embodiment 1, including:

a first acquisition unit U1, for acquiring a target image that has been divided into blocks;

a second acquisition unit U2, for acquiring the definition of each block, respectively;

a third acquisition unit U3, for acquiring normalized central coordinates and a normalized size of a region of interest on the target image;

a full width at half maximum coefficient calculation unit U4, for respectively calculating a full width at half maximum coefficient in the horizontal direction and the vertical direction according to the normalized size;

a weight value calculation unit U5, for calculating a weight value of each block using a two-dimensional discrete Gaussian function according to the normalized central coordinates and the full width at half maximum coefficient;

a normalized overall definition calculation unit U6, for calculating a normalized overall definition of the target image according to the weight value and definition of each block; and a focusing unit U7, for focusing according to the normalized overall definition.

In the automatic focusing apparatus based on a region of interest provided in this embodiment, a user selects a rectangular region, i.e., a region of interest on the target image, followed by automatic generation of a ROI mask for focusing via Gaussian function with several simple parameters of the region of interest, so as to avoid storage of a ROI mask data taking up storage space. In addition, the generated mask can perform focusing using a target object on the periphery when there is no target object at a ROI centre set by the user.

In a specific implementation, the full width at half maximum coefficient calculation unit U4 includes:

a first full width at half maximum coefficient calculation subunit, for calculating the full width at half maximum coefficient in the horizontal direction according to the number of the blocks in the horizontal direction and the width of the normalized size; and a second full width at half maximum coefficient calculation subunit, for calculating the full width at half maximum coefficient in the vertical direction according to the number of the blocks in the vertical direction and the height of the normalized size.

In a specific implementation, the weight value calculation unit U5 includes:

a first central coordinate calculation subunit, for calculating a horizontal coordinate of the central coordinates according to the number of the blocks in the horizontal direction and the horizontal coordinate of the normalized central coordinates; and a second central coordinate calculation subunit, for calculating a vertical coordinate of the central coordinates according to the number of the blocks in the vertical direction and the vertical coordinate of the normalized central coordinates.

As a specific implementation therein, the normalized overall definition calculation unit U6 includes:

a first weighting calculation subunit, for weighting the definition of each of the blocks respectively according to a corresponding weight value;

an overall definition calculation subunit, for summing up the definition of each of the blocks after the weighting of the definition of the blocks, so as to obtain the overall definition;

a first summation subunit, for summing up the weight value of each of the blocks; and a normalization subunit, for dividing the overall definition by the sum of the weight value, so as to obtain the normalized overall definition.

As an alternative specific implementation, the normalized overall definition calculation unit U6 includes:

a second summation subunit, for calculating the sum of the weight value of each of the blocks;

a normalized weight value calculation subunit, for dividing the weight value of each of the blocks by the sum of the weight value, respectively, so as to obtain a corresponding normalized weight value;

a second weighting calculation subunit, for calculating a normalized definition of a corresponding block respectively using the normalized weight value; and a third summation subunit, for summing up the normalized definition of each of the blocks, so as to obtain the normalized overall definition.

Obviously, the above embodiments are merely intended to clearly illustrate rather than limit the numerated implementations. For one with ordinary skill in the art, other different forms of modifications or changes may further be made on the basis of the aforementioned descriptions. It is unnecessary and impossible to exhaust all implementations. And modifications or changes derived herefrom obviously fall into the protection scope of the present invention.

What is claimed is:

1. An automatic focusing method based on a region of interest, comprising the following steps:

acquiring a target image that has been divided into blocks;

acquiring a definition evaluation parameter of each block, respectively;

acquiring normalized central coordinates and a normalized size of the region of interest on the target image;

respectively calculating a full width at half maximum coefficient of the region of interest in the horizontal direction and the vertical direction according to the normalized size;

calculating a weight value of each block using a two-dimensional discrete Gaussian function according to central coordinates and the full width at half maximum coefficient;

calculating a normalized overall definition evaluation parameter of the target image according to the weight value and the definition evaluation parameter of each block; and focusing according to the normalized overall definition evaluation parameter.

2. The method according to claim 1, wherein, the step of respectively calculating a full width at half maximum coefficient of the region of interest in the horizontal direction and the vertical direction according to the normalized size comprises:

calculating the full width at half maximum coefficient in the horizontal direction according to the number of the blocks in the horizontal direction and the width of the normalized size; and calculating the full width at half maximum coefficient in the vertical direction according to the number of the blocks in the vertical direction and the height of the normalized size.

3. The method according to claim 2, wherein, the weight value of the blocks is calculated via the following function:

$$g_{i,j} = c1 * \exp\left(-\left(\frac{(i-\mu_h)^2}{2\sigma_h^2} + \frac{(j-\mu_v)^2}{2\sigma_v^2}\right)\right)$$

wherein, i and j respectively represent the subscript of a row and the subscript of a column where the block is located, which are integers greater than or equal to 0, $g_{i,j}$ represents a weight value of the block, c1 is a constant greater than 0, representing a maximum weight value, $\mu_h$ and $\mu_v$ respectively represent the horizontal coordinate and the vertical coordinate of the central coordinates, $\sigma_h$ and $\sigma_v$ respectively represent the full width at half maximum coefficient in the horizontal direction and the vertical direction.

4. The method according to claim 1, wherein, the step of calculating a weight value of each block according to the central coordinates and the full width at half maximum coefficient comprises a process of calculating central coordinates corresponding to distribution of the blocks according to the normalized central coordinates, comprising:

calculating a horizontal coordinate of the central coordinates according to the number of the blocks in the horizontal direction and the horizontal coordinate of the normalized central coordinates;

calculating a vertical coordinate of the central coordinates according to the number of the blocks in the vertical direction and the vertical coordinate of the normalized central coordinates.

5. The method according to claim 4, wherein, the weight value of the blocks is calculated via the following function:

$$g_{i,j} = c1 * \exp\left(-\left(\frac{(i-\mu_h)^2}{2\sigma_h^2} + \frac{(j-\mu_v)^2}{2\sigma_v^2}\right)\right)$$

wherein, i and j respectively represent the subscript of a row and the subscript of a column where the block is located, which are integers greater than or equal to 0, $g_{i,j}$ represents a weight value of the block, c1 is a constant greater than 0, representing a maximum weight value, $\mu_h$ and $\mu_v$ respectively represent the horizontal coordinate and the vertical coordinate of the central coordinates, $\sigma_h$ and $\sigma_v$ respectively represent the full width at half maximum coefficient in the horizontal direction and the vertical direction.

6. The method according to claim 1, wherein, the weight value of the blocks is calculated via the following function:

$$g_{i,j} = c1 * \exp\left(-\left(\frac{(i-\mu_h)^2}{2\sigma_h^2} + \frac{(j-\mu_v)^2}{2\sigma_v^2}\right)\right)$$

wherein, i and j respectively represent the subscript of a row and the subscript of a column where the block is located, which are integers greater than or equal to 0, $g_{i,j}$ represents a weight value of the block, c1 is a constant greater than 0, representing a maximum weight value, $\mu_h$ and $\mu_v$ respectively represent the horizontal coordinate and the vertical coordinate of the central coordinates, $\sigma_h$ and $\sigma_v$ respectively represent the full width at half maximum coefficient in the horizontal direction and the vertical direction.

7. The method according to claim 1, wherein, the step of calculating the normalized overall definition evaluation parameter of the target image according to the weight value and the definition evaluation parameter of each block comprises:
   weighting the definition evaluation parameter of each of the blocks respectively according to a corresponding weight value;
   summing up the definition evaluation parameter of each of the blocks after the weighting of the definition evaluation parameter of the blocks, so as to obtain the overall definition evaluation parameter;
   summing up the weight value of each of the blocks; and
   dividing the overall definition evaluation parameter by the sum of the weight value, so as to obtain the normalized overall definition evaluation parameter.

8. The method according to claim 1, wherein, the step of calculating the normalized overall definition evaluation parameter of the target image according to the weight value and the definition evaluation parameter of each block comprises:
   calculating the sum of the weight value of each of the blocks;
   dividing the weight value of each of the blocks by the sum of the weight value, respectively, so as to obtain a corresponding normalized weight value;
   calculating a normalized definition evaluation parameter of a corresponding block respectively using the normalized weight value; and
   summing up the normalized definition evaluation parameter of each of the blocks, so as to obtain the normalized overall definition evaluation parameter.

9. An automatic focusing apparatus based on a region of interest, comprising:
   a first acquisition unit, for acquiring a target image that has been divided into blocks;
   a second acquisition unit, for acquiring a definition evaluation parameter of each block, respectively;
   a third acquisition unit, for acquiring normalized central coordinates and a normalized size of the region of interest on the target image;
   a full width at half maximum coefficient calculation unit, for respectively calculating a full width at half maximum coefficient of the region of interest in the horizontal direction and the vertical direction according to a number of the blocks and the normalized size;
   a weight value calculation unit, for calculating a weight value of each block using a two-dimensional discrete Gaussian function according to central coordinates and the full width at half maximum coefficient;
   a normalized overall definition evaluation parameter calculation unit, for calculating a normalized overall definition evaluation parameter of the target image according to the weight value and the definition evaluation parameter of each block; and
   a focusing unit, for focusing according to the normalized overall definition evaluation parameter.

10. The apparatus according to claim 9, wherein, the full width at half maximum coefficient calculation unit comprises:
    a first full width at half maximum coefficient calculation subunit, for calculating the full width at half maximum coefficient of the region of interest in the horizontal direction according to the number of the blocks in the horizontal direction and the width of the normalized size; and
    a second full width at half maximum coefficient calculation subunit, for calculating the full width at half maximum coefficient of the region of interest in the vertical direction according to the number of the blocks in the vertical direction and the height of the normalized size.

11. The apparatus according to claim 9, wherein, the weight value calculation unit comprises:
    a first central coordinate calculation subunit, for calculating a horizontal coordinate of the central coordinates according to the number of the blocks in the horizontal direction and the horizontal coordinate of the normalized central coordinates; and
    a second central coordinate calculation subunit, for calculating a vertical coordinate of the central coordinates according to the number of the blocks in the vertical direction and the vertical coordinate of the normalized central coordinates.

12. The apparatus according to claim 9, wherein, the normalized overall definition evaluation parameter calculation unit comprises:
    a first weighting calculation subunit, for weighting the definition evaluation parameter of each of the blocks respectively according to a corresponding weight value;
    an overall definition evaluation parameter calculation subunit, for summing up the definition evaluation parameter of each of the blocks after the weighting of the definition evaluation parameter of the blocks, so as to obtain the overall definition evaluation parameter;
    a first summation subunit, for summing up the weight value of each of the blocks; and
    a normalization subunit, for dividing the overall definition evaluation parameter by the sum of the weight value, so as to obtain the normalized overall definition evaluation parameter.

13. The apparatus according to claim 9, wherein, the normalized overall definition evaluation parameter calculation unit comprises:

a second summation subunit, for calculating the sum of the weight value of each of the blocks;

a normalized weight value calculation subunit, for dividing the weight value of each of the blocks by the sum of the weight value, respectively, so as to obtain a corresponding normalized weight value;

a second weighting calculation subunit, for calculating a normalized definition evaluation parameter of a corresponding block respectively using the normalized weight value; and a third summation subunit, for summing up the normalized definition evaluation parameter of each of the blocks, so as to obtain the normalized overall definition evaluation parameter.

\* \* \* \* \*